Sept. 27, 1938.  T. P. HELLER  2,131,513

MIXER

Filed May 6, 1937  3 Sheets-Sheet 1

THORNTON P. HELLER,
INVENTOR

BY Donald E. Windle
and Robert W. Randle
ATTORNEYS.

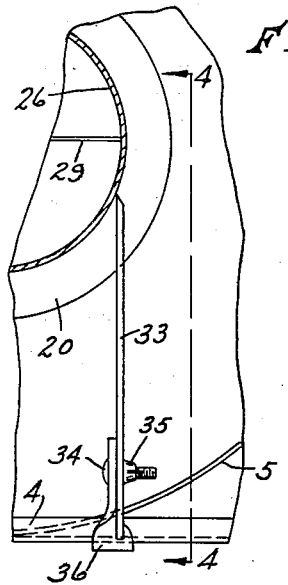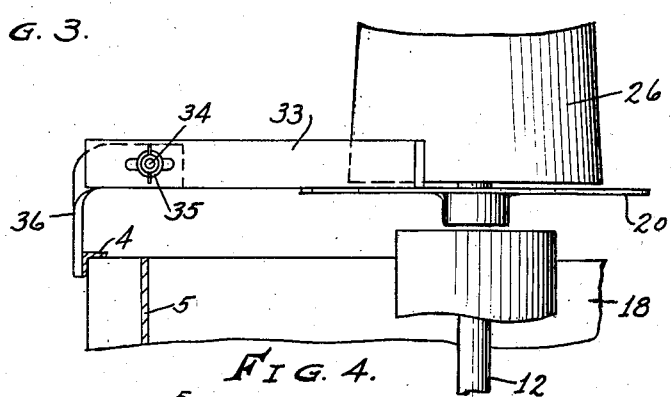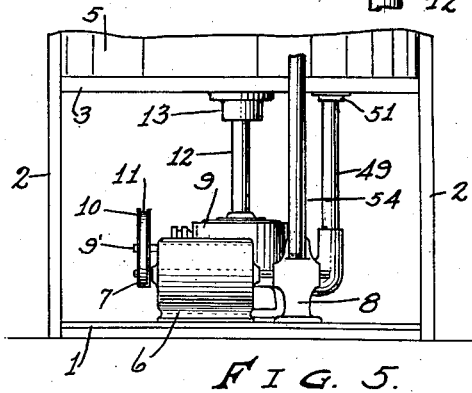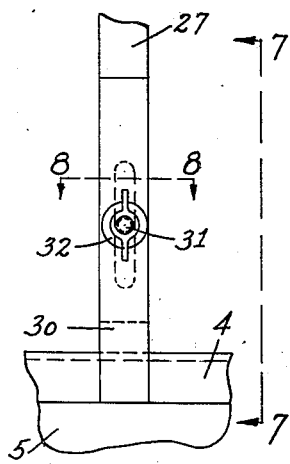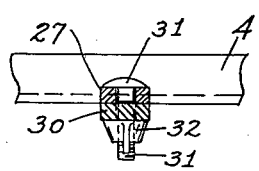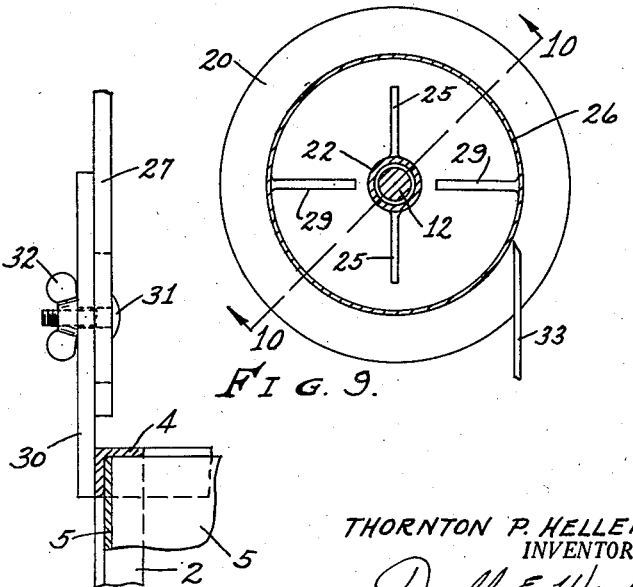

Sept. 27, 1938.  T. P. HELLER  2,131,513
MIXER
Filed May 6, 1937  3 Sheets-Sheet 3

THORNTON P. HELLER,
INVENTOR
BY Donald E. Windle
and Robert W. Kandle.
ATTORNEYS.

Patented Sept. 27, 1938

2,131,513

UNITED STATES PATENT OFFICE 2,131,513

MIXER

Thornton P. Heller, Brownstown, Ind.

Application May 6, 1937, Serial No. 141,128

1 Claim. (Cl. 259—8)

My present invention relates to a mixing machine for mixing barium with water which is used in the manufacture of building blocks and like products.

I am aware that there are mixing machines of various constructions being used for the above-mentioned purpose, but due to the characteristics of barium, these machines are not satisfactory or successful, and in the construction of my device, I have produced a mixer which constantly mixes the barium with water which is used with the dry ingredients in the manufacture of building blocks, and like materials. In order to supply barium to the dry mixture of ingredients, I have produced a mixing machine which constantly supplies the barium to the water, and have also provided a means whereby the solution of barium and water is constantly being circulated, and with means being provided for returning the excess solution to the mixer.

The principal object of the invention is the provision of a mixing machine which provides barium uniformly to water in the desired amounts.

Another object of the invention is the provision of a container for dry barium and having agitators positioned therein, with adjustable means for controlling the amount of barium being used.

A further object of the invention is in the novel arrangement of conduits whereby the excess and unused mixture of barium solution is returned to the mixing machine and is then re-circulated through the conduits under pressure.

A still further object of the invention is the provision of a mixing machine which is simple of construction, which is simple of adjustment, and which is economical to manufacture.

Other objects and advantages of the invention will be apparent during the course of the following description, and that which is new will be pointed out in the appended claim.

The most satisfactory manner of carrying out the principles of the invention in a practical, efficient, and economical manner is shown in the accompanying three sheets of drawings, in which:

Figure 3 is a partial detail plan view of the mixer showing a portion of the feed disc and scraper.

Figure 4 is a side elevation of the feed disc and the scraper, taken from line 4—4 of Figure 3.

Figure 5 is a partial side elevation of the mixer, taken from line 5—5 of Figure 1, and showing the arrangement of the drive unit and the centrifugal pump.

Figure 6 is a partial elevation of one of the hopper adjusting members, taken from line 6—6 of Figure 1.

Figure 7 is a partial side elevation of one of the hopper adjusting members, taken from line 7—7 of Figure 6.

Figure 8 is a detail cross section through the hopper adjusting members, taken on line 8—8 of Figure 6.

Figure 9 is a detail cross section through the hopper, taken on line 9—9 of Figure 1.

Like characters designate like parts throughout the several views.

Figure 1:
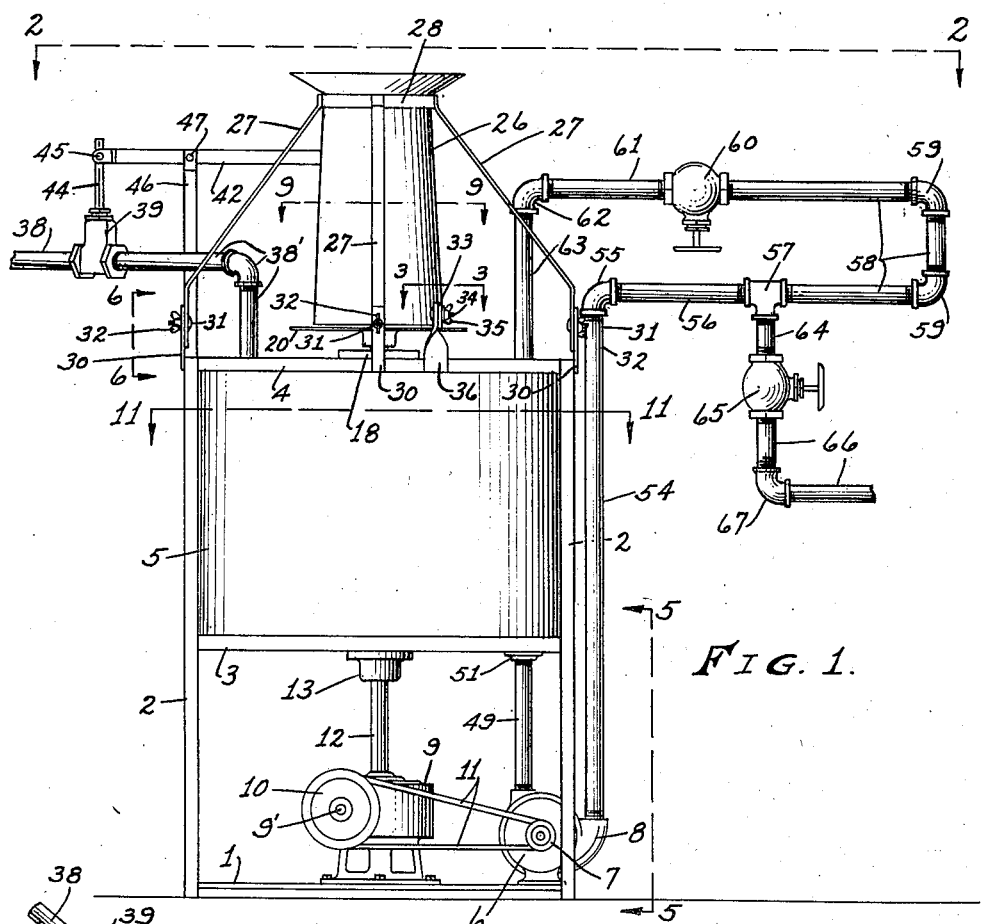
Figure 1 is a side elevation of the mixer with conduits extending thereinto, and therefrom.
Figure 2:
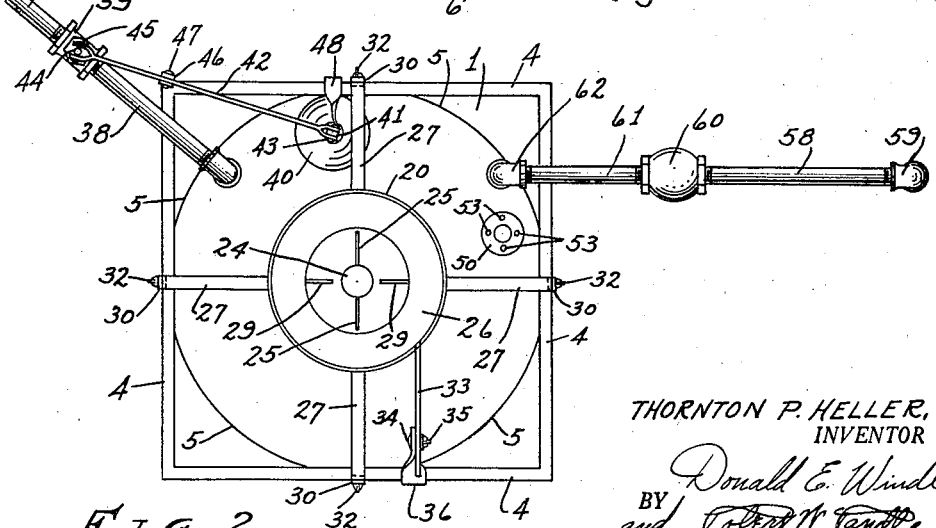
Figure 2 is a plan view of the mixer taken from line 2—2 of Figure 1.

In order that the construction, the advantages, and the utilization of the invention may be more fully understood and appreciated, I will now take up a detailed description thereof, in which I will set forth the same as fully and as comprehensively as I may, reference being had to the accompanying drawings.

In the drawings, 1 designates the base plate which is rigidly secured to and supported by the leg members 2. Each of the leg members 2 is formed of angle iron, or other suitable material. 3 designates the lower supporting tub members which are also formed of angular members with an inwardly extending leg and a vertically disposed leg, with the inwardly extending legs thereof forming a support for the tub 5. Upper members 4 are rigidly secured to the upper end portions of the vertically disposed leg members 2, and form a means of bracing the tub member 5 in fixed position. The tub 5 is preferably formed of sheet metal, and having a bottom portion 5' formed therein.

Numeral 6 designates an electric motor which has a shaft extending from each end thereof, one end of which has the pulley 7 secured thereon, and with the opposite end thereof extending through the centrifugal pump 8. A geared speed reducer 9 is positioned at the central portion of the base plate 1, and is rigidly secured thereto.

A horizontally disposed shaft 9' extends from the speed reducer 9, and to which the pulley 10 is rigidly secured. The speed reducer 9 is actuated by the electric motor by means of the belt 11.

A vertically disposed central shaft 12 extends upwardly from the speed reducer 9 through the bottom portion 5' of the tub 5, with the upper end portion of the shaft being positioned near the upper end of the hopper member. A sealing joint is provided around the shaft at the bottom of the tub by means of the flanged member 13, the gasket members 14, and the inner casing 15. The lower end of the inner casing 15 is rigidly secured through the bottom of the tub by means of the rivets 16, or by other suitable means.

The inner casing 15 extends upwardly from the bottom of the tub, and has the bearing member 17 secured in the upper end portion thereof, with the shaft 12 extending through the bearing member 17.

An outer casing 18 is rigidly secured, at its upper end, to the shaft 12, and is revolvable therewith. The outer casing 18 extends downwardly around the inner casing 15, with the lower end portion thereof terminating slightly above the bottom of the tub. Agitators 19 are rigidly secured, at their inner ends to the lower end portion of the outer casing 18, and extend outwardly therefrom, with the same providing a means of constant agitation of the mixture within the tub 5.

The disc 20 is rigidly secured through the shaft 12 by means of the rivet 21, or by other suitable means, and is revolvable therewith. The upper casing 22 is rigidly secured to the upper end portion of the shaft 12 by means of the rivets 23, or by other suitable means. A cap member 24 is secured over the upper end of the casing 22. Agitator members 25 are rigidly secured to the casing 22, and extend outwardly therefrom.

Figure 10:
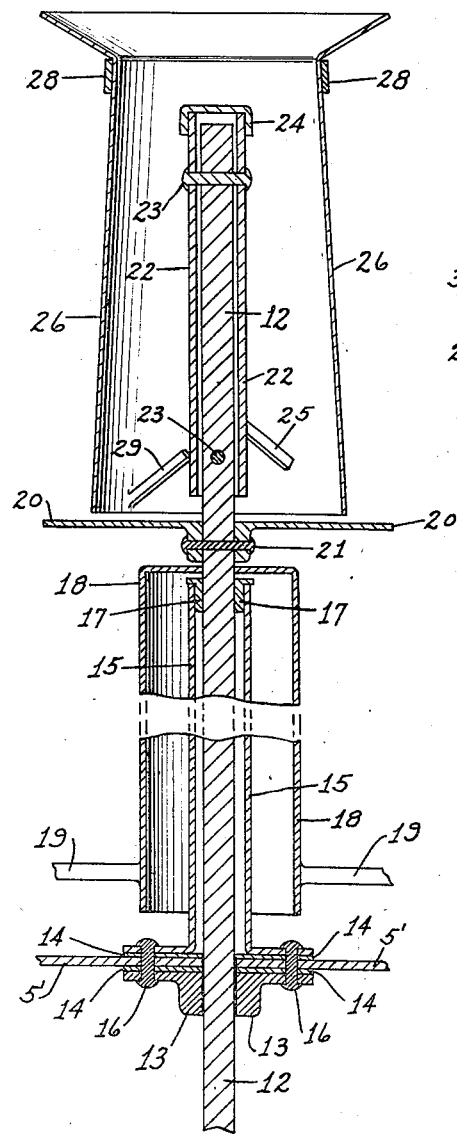
Figure 10 is a detail vertical section through the central shaft and the hopper.
Figure 11:
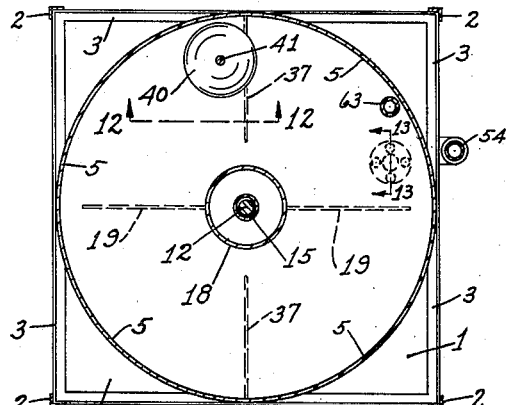
Figure 11 is a detail cross section through the mixer, taken on line 11—11 of Figure 1.
Figure 12:
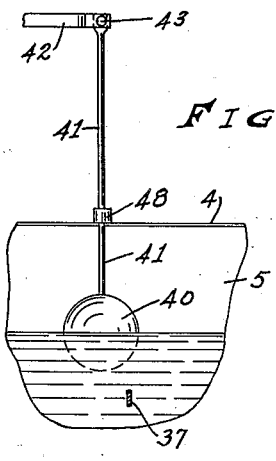
Figure 12 is a detail section taken on line 12—12 of Figure 11, and showing the arrangement of the valve float which governs the depth and flow of water into the mixer.

The hopper 26 is adjustably supported above the disc 20 by means of the supporting bracket members 27 which are rigidly secured to the band 28, which extends around the upper portion of the hopper. It will be noted that the body of the hopper 26 is slightly larger in diameter at the lower portion than at the upper portion, the same being formed thus to prevent the barium from becoming packed therein. Inwardly extending arm members 29 are permanently secured, at their ends, to the inner surface of the hopper 26. It will be noted that the arm members 29 are positioned slightly below the path of the revolvable agitator members 25, as shown in Figure 10.

The lower end portions of the supporting brackets 27 are adjustably secured to the upright arm members 30 by means of the bolts 31 and the wing nuts 32. Each of the supporting bracket members has an elongated aperture formed in the lower portion thereof, with the same adapted to register with an aperture formed through the respective upright arm member 30. Each of the upright arm members is rigidly secured to an upper frame member 4. Vertical adjustment of the hopper 26 is obtained through the slotted apertures formed through the bracket members 27 by means of the bolts 31, and the desired spacing between the lower end of the hopper 26 and the upper surface of the disc 20 is obtained thereby.

The scraper member 33 is provided for scraping the barium from the disc 20 into the water contained within the tub 5. The scraper 33 is adjustably positioned with relation to the hopper 26 by means of the threaded bolt 34 and the wing nut 35, and with the bracket 36 which is rigidly secured to one of the members 4.

Stationary arms 37 are secured at their outer end to the inner side of the tub and project inwardly therefrom, with the arms providing a means for preventing the water from swirling as the same is agitated by the revolving agitators 19 which are secured to the outer casing member 18.

Water is admitted into the tub 5 through the supply pipe 38. A gate valve 39, located in the pipe 38, is opened and closed by means of the float 40 which is located within the tub 5. The float 40 has the upwardly extending arm 41 rigidly secured thereto which is pivotally attached to the arm member 42 by means of the rivet 43, and with the opposite end of the arm member 42 being pivotally secured to the upper end of the valve rod 44 by means of the rivet 45. The arm 42 is supported near its central portion by means of the upwardly extending post member 46 with the rivet 47 extending therethrough and forming a fulcrum thereby. A guide member 48, having a loop formed at one end thereof, forms a guide for the arm in its vertical movements.

Figure 13:
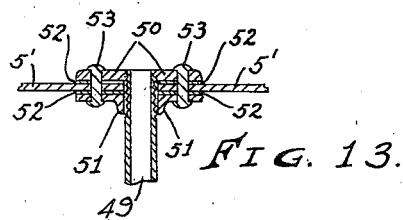
Figure 13 is a detail section through the liquid outlet, taken on line 13—13 of Figure 11.

The pipe 49 is secured through the bottom of the tub, and is secured therein by means of the threaded washer member 50 which, together with the companion member 51, the gaskets 52, and the rivets 53 form a tight joint between the bottom of the tub and the pipe 49, all as shown in Figure 13. The pipe 49 extends downwardly from the tub with its lower end portion being threaded into the intake opening of the centrifugal pump 8.

The pipe 54 extends upwardly from the outlet opening of the pump 8 to one side of the elbow 55. The pipe 56 extends from the opposite opening of the elbow 55 to the T fitting 57. A series of pipes 58 and elbows 59 extend from the opposite side of the T to the valve 60 which connects with the pipe 61. An elbow 62 is threaded onto the projecting end of the pipe 61, and the pipe 63 extends downwardly from the elbow 62 and into the tub 5 where the same ends with its lower end being open.

The pipe 64 extends from the T 57 to the valve 65, with the series of pipe 66 and elbows 67 extending from the valve 65 to a pug mill (not shown) where the water is delivered for mixing with dry ingredients.

In the operation of the mixer, with the same being constructed as above set forth, and with the hopper being filled with barium, water is admitted into the tub 5 through the supply pipe 38, the gate valve 39, and the conduits 38'. The level of the water within the tub is controlled through the gate valve 39 by means of the float 40 and the arms connecting the same. The central shaft 12 is rotated by means of the speed reducer 9 which is actuated by the electric motor 6 through the pulleys 7 and 10 and the belt 11. As the central shaft 12 rotates, the outer casing 18, together with the agitators 19 carried thereby, the disc 20 and the upper casing 22, together with the agitators 25, are rotated.

As the disc 20 and the upper casing 22, together with the agitators 25, are rotated, barium is fed from the hopper 26 to the upper surface of the disc 20, where it is fed into the tub and the water by means of the scraper 33. The barium is thoroughly mixed with the water in the tub by means of the revolving agitators 19.

Water is drawn from the bottom of the tub by gravity and also by means of the centrifugal pump 8, and is forced through the pipe 54, the elbow 55, the pipe 56, the T 57, the pipes 58, the elbows 59, the valve 60, the pipe 61, the elbow 62, and the pipe 63, from which it is discharged into the tub, from which it is recirculated through the above-described circuit. Water, for use with the dry ingredients, is carried from the above-described circuit, through the pipe 64, the valve 65, the pipes 66 and the elbows 67, to the pug mill.

It will be apparent, from the above description, that the quantity of barium dispelled into the water can be regulated by raising or lowering the hopper with relation to the disc by means of the brackets 27 and the bolts 31. The desired amount of water being dispelled into the pug mill is regulated by means of the valve 65. The excess water that is not required at the pug mill is re-circulated through the circuit of pipes and fittings. The valve 60 is provided in order that the pressure of the water flowing to the pug mill may be increased by closing the valve 60, or a lesser degree of pressure of the water to the pug mill is obtained by opening the valve 60.

From the above description, it will be apparent that the quantity of barium entering the water may be minutely controlled, and that the mixture of barium and water is constantly agitated. It will also be apparent that there is no waste of the mixture, due to the excess mixture being returned to the tub.

I desire that it be understood that minor changes may be made in the several details and in the arrangement of the parts herein shown and described, insofar as such changes may fall within the scope of the appended claim.

I also desire that the mixer may be used for purposes other than that described herein, and I am not to be limited to the above-named ingredients being used in connection therewith.

Having now fully shown and described the invention, what I claim, and desire to secure by Letters Patent of the United States, is:

In a mixing machine of the class described, the combination of a dry ingredient container mounted above a water container, agitators revolvably positioned in each of the containers, a revolvable shaft extending upwardly through the water container and into the dry ingredient container, a disc rigidly secured on said revolvable shaft and positioned above the water container and below the dry ingredient container, a relatively stationary scraper member resting on the disc and directing dry ingredients from the revolving disc into the water container, and with means providing longitudinal movement to the scraper member and providing a varying proximity of the scraper with relation to the dry ingredient container.

THORNTON P. HELLER.